Feb. 19, 1935. P. N. ELDERKIN 1,991,451
ELECTRICAL TESTING MEANS
Filed March 5, 1929

INVENTOR,
PAUL N. ELDERKIN;
BY
ATTORNEY

Patented Feb. 19, 1935

1,991,451

UNITED STATES PATENT OFFICE 1,991,451

ELECTRICAL TESTING MEANS

Paul N. Elderkin, Los Angeles, Calif.

Application March 5, 1929, Serial No. 344,540

6 Claims. (Cl. 175—183)

This invention relates to a useful and novel testing apparatus for different uses, but more particularly to testing spark-gap devices or instrumentalities, such as spark-plugs and the like, and also for determination of electromotive forces, their suitability or inadequacy for any specific purpose.

The object of the invention is to provide a means for frequent and recurrent testing which will be of low cost; reliable in its indications, and capable of being quickly applied, and the indications observed, certain of said indications showing the equivalent of a derived or computed result, instead of being mere data for use in computations.

With the foregoing and other objects in view, the invention consists in the novel and useful formation, construction, inter-relation and combination of parts, members, features, all as hereinafter described, shown in the drawing and finally pointed out in claims.

Figure 1:
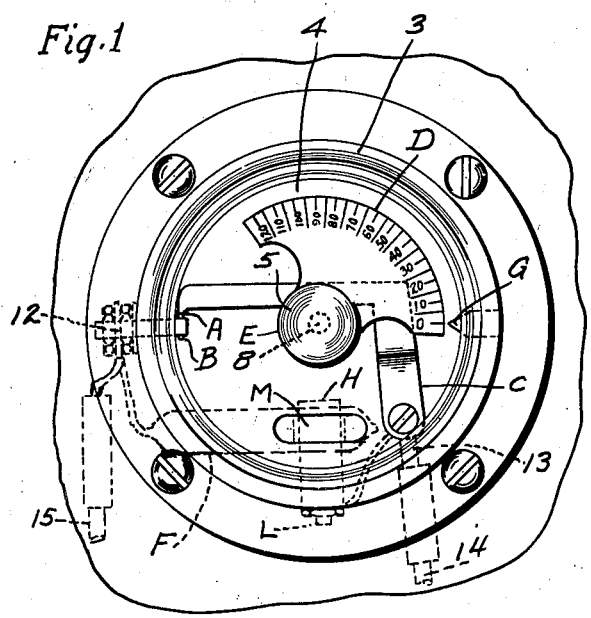
Fig. 1 is a plan or top view of the instrument.
Figure 4:
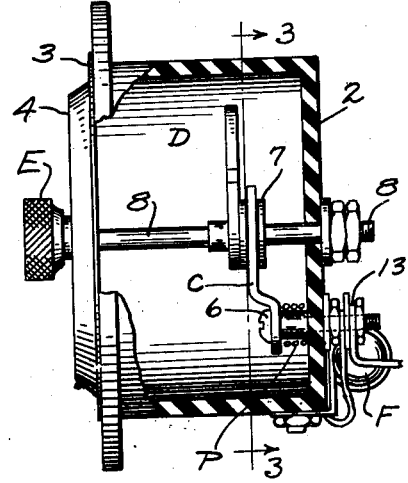
Fig. 4 is a horizontal elevation, principally in vertical section.
Figure 3:
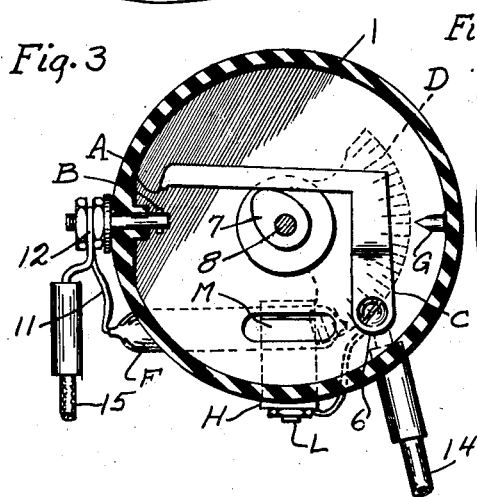
Fig. 3 is a horizontal section on section line 3—3.
Figure 2:
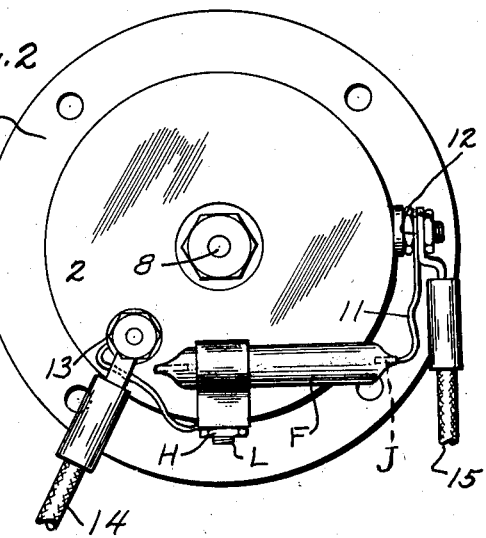
Fig. 2 is an under plan, or bottom view of the instrument.
Figure 5:
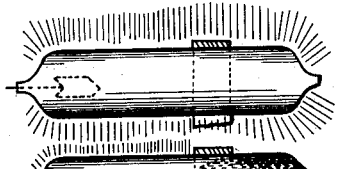
Figs. 5, 6 and 7 are drawings of a tube shown in the other figures with indications of varying degrees of illumination thereof.
Figure 6:
Figure 7:
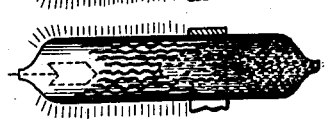

In the several figures, 1 is a casing, or container, for the working or moving parts of the instrument; 2 is a bottom closure therefor, 3 is a top cover, having set into an annular portion thereof a transparent portion 4, usually a circular glass panel, through which the parts and indications of the instrument may be observed. Of course, the entire cover or any portion thereof may be of a transparent substance if desired. For electrical and electrostatic reasons, the case is of some dielectric material having the appropriate mechanical characteristics for an enclosing casing. The inner working parts of the device comprise the variable spark-gap electrodes, the means for varying the gap at will, and a coincidently movable indicating means, as shown. The spark-gap lies between the cooperating contact points, or electrodes, A and B, whereof A is the terminating portion of member C, pivoted about stud 6, as shown. This member is bent in the form of an L for convenience in construction and assembling.

Member C, and with it, spark point A, is caused to move, revolving around stud 6 by the rotation of central shaft 8, which has attached thereto a cam 7; shaft 8 is made of a suitable dielectric material. The cam rests against one side of the horizontal portion of the member C, and by the change in the angular position of this cam the distance apart of the spark points A and B is changed. A coil spring, P, encircling post 6, presses member C against the cam surface causing C to move back and follow the motion of the cam when the latter retreats. While many mechanical connections between shaft 8 and revolving arm C can be used, the cam is preferable because it can be so shaped that uniform graduations on the indicating scale D can be employed. Attached to shaft 8 and cam 7 is the sector D whereon is marked the divisional scale which cooperates with the fixed pointer G, so that as rotation of the shaft 8 causes separation of the points A and B, the indications of the simultaneously moved sector, opposite pointer G, show some quantity which applies to the degree of opening of the spark points. Obviously, the scale may be graduated to give any desired indications or, in fact, several simultaneous readings. These readings may show the absolute distance apart of the spark points to any measurement, inches, millimeters or other suitable scale; or the graduations may show arbitrary conditions or equivalents of separation distances, compensated for specific effects or conditions; or, as stated, several of these, or other, scales may be marked on the segment for simultaneous readings as desired.

A turning or twisting member, E, is provided for turning the shaft 8 easily and conveniently, this member being attached to the shaft at the outer, or upper, end thereof, after passing outside the cover, as shown.

One terminal is connected to the fixed spark electrode A, the other terminal being connected to the pivot or stud 6, so that the external electromotive force across the two connecting leads is impressed on the spark points. Hence, this portion of the device comprises a variable spark-gap, an electrode whereof is manually moved through an infinite number of separating distances, and an indicator for determining the relative or absolute electromotive force across the gap.

The second portion of the apparatus comprises a glow tube of peculiar design and construction, indicated by F in the figures. This is a transparent tube of some dielectric material,—e. g., glass—in which has been introduced some kind of gas, usually some one of the constituents of air, at a comparatively low pressure. The air in the tube is first withdrawn and the said gas introduced into the vacuum space until the desired pressure is attained. This pressure may differ considerably for different uses, but, in general, it ranges between the equivalent of 15 to 50 millimeters of mercury, or from 2 to 7 per cent of normal, sea-level atmospheric pressure.

An electrode, J, is sealed in one end of the tube which is connected to an exterior terminal by a conductor, 11. A metal band, or strip, H, partly surrounds the tube near the end opposite that into which the electrode J is sealed. This band clamps the tube and forms its support, being held by bolt or screw, L, and also, is the opposite electrode of the device. Under a sufficient impressed electromotive force, an alternating, or pulsating, current will flow from electrode J to the gas in the tube, charging it to the potential of the electrode, and induce a corresponding opposite potential in the outer metal electrode, through the separating dielectric of the tube wall, thereby producing alternating current flow through the gas and causing it to glow. The device, is in effect, a condenser of a peculiar character, whereof the gas is one plate, the metal supporting band the other, the tube wall being the separating dielectric. Obviously, no direct current can pass through this gas-filled condenser except the pressure be high enough to puncture the dielectric. Although the current flow through the tube is less, for a given electromotive force, than it would be if the outer terminal were located inside the tube, the use of the external electrode makes the operation far more stable and reliable. In fact, the tube having both electrodes inside it, is too unstable and unreliable to serve as an indicating instrument and repeated tests have demonstrated the necessity of adoption of one external electrode for reliability of indications and improved sensitiveness. The tube is so located that a portion of it is visible through the transparent cover of the spark-gap instrument, there being a slot, M, cut in the bottom of the containing casing through which the tube can be seen, this latter being fastened in immediate juxtaposition to the bottom 2 of the container. By this arrangement, the spark-gap and the visible section of the tube are simultaneously seen by a single observation through the transparent cover portion 4.

The terminals of the spark-gap are connected to the instrument terminals, 12 and 13, respectively, as are the electrodes of the glow-tube condenser, so that any electromotive force applied to the one is simultaneously applied to the other. Hence, the observations of the spark-gap and the tube are simply two simultaneous, though differing, tests of the kind and amount of the appled electrical pressure wave. For instance, under a certain pressure and separation of the terminals A and B, there will be a passage of sparks across the gap, and, coincidently, a highly luminous glow in the tube. Of course, the flow of current through the tube and its luminosity, depend on the maximum value of the impressed voltage wave and on the frequency, while the flow across the gap depends both on the degree of separation of the electrodes and the voltage impressed across them. The actual spark which jumps across from one electrode to the other, is so fleeting, practically instantaneous, and its light color is so difficult to see clearly, that the additional glow-tube indication is most helpful in determination of the efficacy, voltage condition and relation of the different elements in an electrical system.

When the gap is closed entirely, there is practically no voltage required to pass a small amount of current across the contacting electrodes A and B, so that no electrical pressure is applied to the instrument terminals and no current flows through the tube even though a considerable current flow may take place across the gap electrodes. If the gap is opened and the resistance to current flow across it increased, the electromotive force at the terminals is correspondingly increased, until a voltage is reached at which the tube begins to glow. Additional voltage across the instrument terminals will increase the degree of luminosity until at some predetermined voltage, the inside of the tube is brilliantly illuminated. In other words, the voltage impressed on the tube is a function of the gap opening, so that the luminescence of the tube will vary with the gap length.

The brilliance diminishes as the voltage is lowered and, after the point is reached where the entire tube is no longer completely illumined, dark portions begin to appear. At first, the dark section is only a short length of the tube beginning at the end nearest the outside terminal and continuing towards the opposite end to a point just past the outer metal band, H. As the voltage falls, this dark portion extends further and further towards the end into which the inner electrode has been sealed, the dark portion appearing as a cone of darkness rather than a completely darkened cylinder of the section of tube into which the dark zone has advanced. The small end of this dark cone is towards the inside terminal. After this darkened zone has reached to about the middle of the tube length, dark lines, or striæ, begin to appear which are, in effect, nearly the total tube length in extent, running from the bright zone, around the inner electrode, to the dark section, at H, so that, instead of a tube completely glowing over all or only a part of its length, there appears only a short section alight, viz: that section from the end near the inside electrode up to the extreme inner end of this electrode. Between that bright zone and the darkened portion at the opposite end, alternate light and dark striæ appear, like narrow ribbons of luminousness and darkness, extending between the bright and the dark ends of the tube.

A skilled observer, i. e., one who has had a few hours' practice in watching the operation of the tube under different voltage conditions, and the light effects therein, their character, the relation between the light and dark lengths of the tube, the degree of brilliance, the length, and the relative widths of light and dark striæ, the rapidity with which they change in position, and other luminous phenomena, under changes in impressed voltage, can translate his observations into determination of the character and degree of the electromotive force conditions which caused them.

As is well known in the art, an electric spark across a very short gap, is difficult to observe. The spark is a light blue color which has an inherently low degree of visibility. Its passage across a gap, where a single break and a single spark only are formed in each cycle, is practically instantaneous; for the usual spark-plug setting the length is less than ¼ inch and the diameter negligibly small. For all of which reasons spark visibility in the daylight is low and its ocular observation difficult and uncertain. Hence, the glow-tube is a valuable adjunct in making clear and, practically, increasing the visibility of the sparking and voltage conditions. So that the glow tube, in addition to the independent indications which it shows in making certain tests, serves as an auxiliary indicator for the spark-meter gap.

This combination of a plurality of individually novel means, has several applications. For instance, it is especially adapted for the testing of spark-plugs when in position and subject to a surrounding pressure. Also, for testing electromotive forces and the performance and condition of different parts of electrical systems.

The spark-gap of the instrument may have its scale divided to show the changed conditions of voltage required for a spark-plug under pressure, instead of the conditions for firing under atmospheric pressure.

As is well-known in the art, the electromotive force required to cause current to jump a given gap, increases as the ambient pressure increases. In fact, this relation is so definite that it is practically possible to determine the gas pressure under which a spark-gap is being operated by the electromotive force applied, assuming that the gap is definitely fixed and calibrated. So that a spark-plug which will spark satisfactorily in an atmospheric test may not work at all under the compression pressure of the motor in which the plug must fire.

By appropriate calibration, the scale on the sector D of the spark-meter may be made to represent the pressures of the gas to be fired by a spark-plug, having a known air gap, though the instrument gap be tested under atmospheric pressure. Assuming that the spark-plugs to be tested have been standardized, all having a definitely fixed gap, the scale of the instrument may be graduated to show the equivalent spark-gap under various pressures, and so, the test gap fixed by moving the scale to the setting corresponding with the pressure under which the plugs will normally work. This would open the test gap an amount greater than the gap in the spark-plug because the pressure around the test gap is atmospheric while the spark-plug must fire under pressure. The increase in, or excess of, opening, will equal, in its opposition to passage of electric current, the increase produced by the gas pressure in which the spark-plug is to be fired. If the gap of the instrument be set for the equivalent of a spark-plug gap under some predetermined surrounding pressure, then it can be employed to test the electrical firing equipment of any electrically fired motor, by simply connecting the instrument terminals across the secondary, or high-tension system. The length of the gap will fix the maximum voltage applied to the glow-tube. Hence, if sparks pass across the gap and, simultaneously, the tube glows, this constitutes a complete test of the electrical firing system of the motor and shows it to be ample as well as in good order. Obviously, the electrical systems of motorcar and other internal combustion motors can be quickly and definitely tested as can also any alternating or pulsating system.

Some of the tests in which the tube indications, alone, and independent of the spark-meter gap, are depended on to show the existing conditions, comprise (A) condition of spark-plugs, (B) tests for leakage of high-tension current between adjacent wires, (C) condition of breaker points, and (D) condition or sufficiency of spark coil.

In each of these tests, the motor is run without load at "idling" speed—usually 250 R. P. M. The spark-gap meter and tube are connected in the same manner for (A) and (B), viz: one side of the spark-meter and glow-tube grounded, the other side connected to the spark-plug. This connects the plug and spark-meter in parallel. For test (A), open spark-gap a distance somewhat greater than that of the spark-plug gaps—usually 0.025 inch. Obviously, if each plug tested is good, no spark will cross the longer parallel gap of the spark-meter. If a spark should jump the spark-meter gap, this would indicate a corroded, badly adjusted, "burned", or otherwise unsatisfactory plug. If the glow-tube shows a bright, full flash, without skip or striæ, then the plug being tested is in good condition. But a fouled or corroded plug will show a weak striated flash, while a short-circuited plug will be accompanied by an entirely dark tube.

For test (B), use spark-plugs previously tested and of known excellence. Open spark-meter gap to length somewhat in excess of that of the spark-plug gap. When motor is running, inspect glow-tube for regularity of flash. A main, bright flash alternating with a small, or weak, flash, shows leakage from an adjacent wire to that under test.

If the spark-meter connection be now changed so that it is in series between the coil and plug and the dial is set at a figure representing normal compression of the motor, and there is a steady bright flash in the tube, the wire is not leaking to ground. If flash is not steady, disconnect the wire under test and with another wire connect from distributor to plug with spark-meter in series. If this eliminates unsteady or weak flashes and tube gives a bright steady flash, this shows wire tested to be defective, and leaky, provided the breaker points have been previously tested and shown to be in good order.

For tests (C) and (D), the spark-meter is connected in series between the coil and the distributor center post lead. Start motor with spark-meter gap closed. After running at, say, 250 R. P. M., open gap to length corresponding to normal compression of motor. If tube flash is bright, free from skip or striæ, the coil under test is in good order and produces a satisfactory voltage, provided breaker points are known to be in good condition. If coil is in bad order, or, for any reason, produces an insufficient voltage, this will be shown by weak flashes, partial darkness and striæ in glow-tube. For test (D) the connections and procedure and observed tube indications are similar to test (C). Dark or black tube with striæ point to dirty or corroded breaker points. After these are inspected and rectified, then test (C) is made as is obvious.

Having described my invention, in connection with illustrative embodiments, forms and arrangements of parts, it will be understood that many variants thereof are possible to those skilled in the art, and my invention, in its broader aspects, is not limited to the particular construction or application herein shown and described, as changes in the sizes, proportions, configurations, arrangements, assemblage, inter-action, juxtaposition and mechanical relations, as well as additions, omissions, substitutions, combinations and alterations of forms, parts, members and features may be made without departing from the broad spirit of this invention.

Having thus disclosed my invention, I claim and desire to secure by Letters Patent:

1. A device for testing ignition systems of internal combustion engines comprising a casing, a stationary electrode within said casing, a pivoted arm within said casing constituting a second electrode for cooperation with said first mentioned electrode, a rotatable shaft extending into said casing and provided with a cam for cooperation with said arm to pivotally adjust the same thereby to vary the distance between the electrodes, means for the connection of the electrodes with the terminals of a spark gap to be tested, cooperating pointer and calibration means one on the casing and the other on the shaft to determine the spacing of the electrodes, and means whereby the electrodes are rendered visible.

2. A device as set forth in claim 1 including a glow tube connected across the terminals of the electrodes.

3. A device for testing ignition systems of internal combustion engines comprising a casing, a stationary electrode within said casing, a movable electrode within said casing and spaced from said stationary electrode, means terminating exteriorly of the casing for moving said movable electrode toward and away from said stationary electrode, a calibrated indicia cooperating with said movable electrode, a lead connected to each of said electrodes and transparent means in a wall of said casing for rendering said electrodes and calibrations visible from the exterior of the casing.

4. A device for testing ignition systems of internal combustion engines comprising a casing, a stationary electrode within said casing, a movable electrode within said casing and spaced from said stationary electrode, means terminating exteriorly of the casing for moving said movable electrode toward and away from said stationary electrode, a lead connected to each of said electrodes, transparent means in a wall of said casing for rendering said electrodes visible from the exterior of the casing, and a calibrated indicia cooperating with said movable electrode for indicating the degree of movement of the movable electrode with respect to the stationary electrode.

5. A device for testing ignition systems of internal combustion engines including a casing, a stationary electrode and a movable electrode both mounted within the casing, means projecting exteriorly of the casing for operating said movable electrode with reference to the stationary electrode, indicating means associated with said last named means and arranged within the casing, said indicating means cooperating with said movable electrode to gauge its position with reference to the stationary electrode, and a transparent wall for the casing for rendering said electrodes and indicating means visible from the exterior of the casing.

6. A device for testing ignition systems of internal combustion engines including a casing, a stationary electrode, a movable electrode spaced from said stationary electrode, means for operating said movable electrode, indicating means cooperating with said movable electrode to gauge its position with reference to the stationary electrode, a glow tube connected across the electrodes, and means for rendering said electrodes, indicating means, and glow tube visible simultaneously from the exterior of the casing.

PAUL N. ELDERKIN.